(12) United States Patent
Wong

(10) Patent No.: US 6,520,687 B2
(45) Date of Patent: Feb. 18, 2003

(54) OPTICAL FIBER SIGNAL CONNECTOR

(76) Inventor: Shen-Chia Wong, No. 10, Lane 121, Li-Der Rd. Peito District, Taipei (TW)

( * ) Notice: Subject to any disclaimer, the term of this patent is extended or adjusted under 35 U.S.C. 154(b) by 0 days.

(21) Appl. No.: 09/827,146

(22) Filed: Apr. 6, 2001

(65) Prior Publication Data

US 2002/0146212 A1 Oct. 10, 2002

(51) Int. Cl.$^7$ ................................................. G02B 6/36
(52) U.S. Cl. ......................................................... 385/76
(58) Field of Search ........................... 385/76, 43, 147, 385/124, 125, 126, 77, 80, 78, 92, 93, 94, 139

(56) References Cited

U.S. PATENT DOCUMENTS 5,666,453 A * 9/1997 Dannenmann ............... 385/101
5,748,820 A * 5/1998 Le Marer et al. ............. 385/43
6,231,244 B1 * 5/2001 Fukuyama et al. ........... 385/76
6,361,218 B1 * 3/2002 Matasek et al. .............. 385/60

* cited by examiner

Primary Examiner—Lynn D. Feild
Assistant Examiner—J. F. Duverne
(74) Attorney, Agent, or Firm—Troxell Law Office PLLC

(57) ABSTRACT

The present invention relates to an optical fiber signal connector; the said optical fiber signal connector is, via two or more than two optical fiber conducting wires, connected to the single-optical fiber connectors of the corresponding and respective parting lines on the other ends; two or more than two optical fiber core wires are accommodated in the connecting tube of the optical fiber signal connector; one end of the optical fiber core wire is formed as one or more than one inclined planes; therefore, after two or more than two optical fiber core wires are inserted into the connecting tube, a complete circular shape will appear; the complete circular section can fill in the end head of the connecting tube with no gap existed and thereby ensure excellent signal transmission functionality.

4 Claims, 4 Drawing Sheets

OPTICAL FIBER SIGNAL CONNECTOR

BACKGROUND OF THE INVENTION

1) Field of the Invention

The present invention relates to an optical fiber signal connector which is connected to two or more than two optical fiber connectors of the parting lines via two or more than two optical fiber conducting wires; two or more than two optical fiber core wires are inserted inside the connecting tube of the optical fiber signal connector; the connecting structure of two or more than two optical fiber core wires enables the complete filling at the end head of the connecting tube without causing any loss of the signal transmission.

2) Description of the Prior Art

Accordingly, in the recent years, since the optical fiber has the advantages of having small diameter, large capacity and fast transmission speed, to utilize the optical fiber as the transmission channels has become the main trend in the communication industry.

The pictorial view drawing of FIG. 1 shows a conventional single-optical fiber connector (10). The single-optical fiber connector (10) has two connectors (12) co-joined respectively to the two ends of the optical fiber signal wire (11). Therefore, the connectors (12) have only one signal wire (11). When it needs to distribute the signal to two signal connectors on the parting lines, there are technical related problems to be overcome. In terms of the present technique, as shown in FIG. 1A, inside the connecting tube (13) of the optical fiber signal connector (10), two narrower optical fiber core wires (14) are inserted therein and then formed individually by heat welding at the end head (15). Since there is a gap (16) formed between the two optical fiber core wires (14) and the end head (15), it is necessary, through heat welding, to melt the end heads of the two optical fiber wire cores (14) and co-join them into one unit (as shown in FIG. 1A). Since it takes a very short time for the optical fiber core wire (14) to be heat welded and the length of the end head (15) projected outwards should not be too long, therefore, the factor of the incomplete spread of the round section after heat welding causes the gaps (16) to form at the welded location of the two round sections, and fails to fully fill in the interior section of the end head (15), and therefore reduces the signal transmission functionality of the optical fiber connector.

In view of this, the inventor of the present invention, based on the experience gained from engagement in related product manufacturing and distribution in many years, addressed the said shortcomings by enthusiastically researching solutions for them which, following continuous experiment and improvement, finally culminated in the development of the present invention of the optical fiber signal connector.

SUMMARY OF THE INVENTION

Therefore, the primary objective of the present invention is to provide an optical fiber signal connector; the optical fiber signal connector is, via two or more than two optical fiber conducting wires, connected to the corresponding and respective single optical fiber connectors of the parting lines on the other ends; two or more than two optical fiber core wires are accommodated inside the connecting tube of the optical fiber signal connector; further, through the connecting structure of the two or more than two optical fiber core wires, the end head of the connecting tube can be completely filled in for ensuring the excellent signal transmission functionality.

To enable a further understanding of the features and the technical content of the present invention, the brief description of the drawings below is followed by the detailed description of the preferred embodiment. However, the attached illustrations are only for reference and explanation, but not for limiting the present invention.

DETAILED DESCRIPTION OF THE PREFERRED EMBODIMENTS

Figure 1:
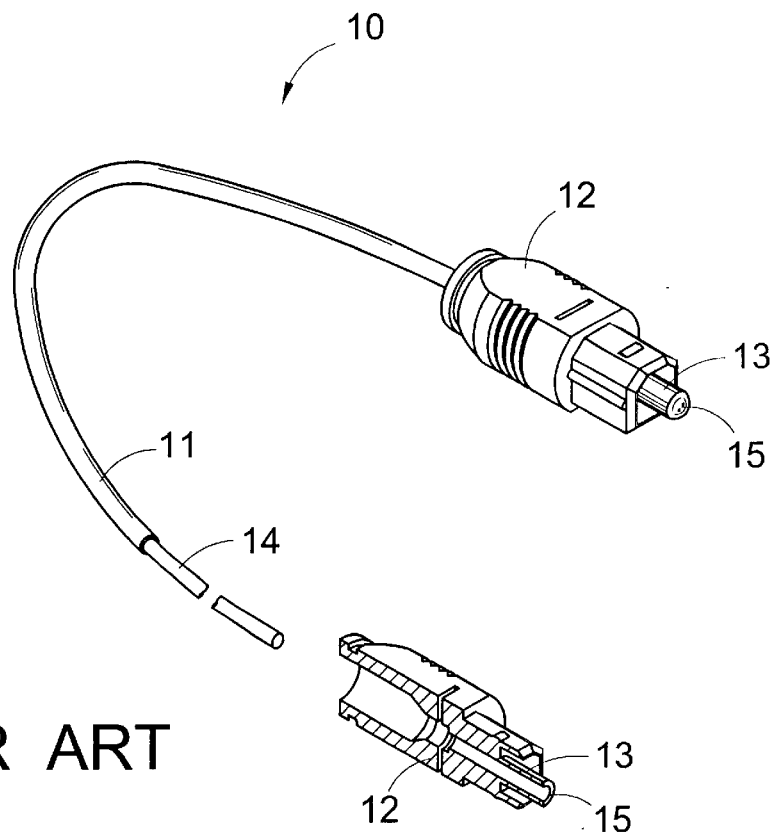
FIG. 1 is a pictorial view drawing of the conventional optical fiber signal connector.
Figure 1A:
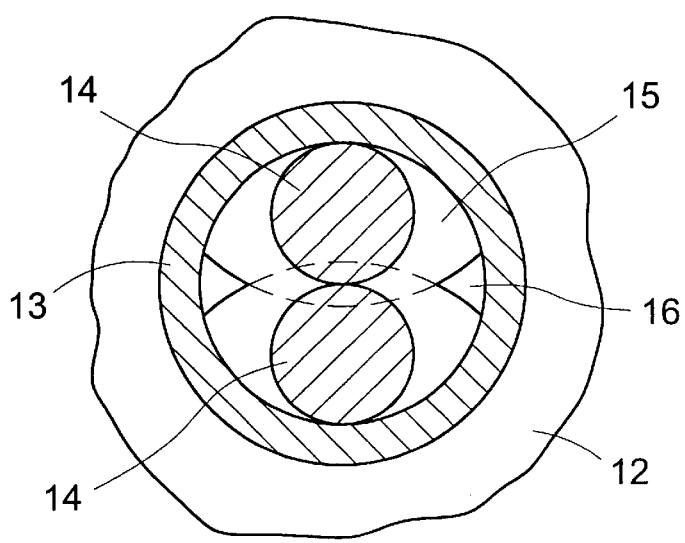
FIG. 1A is an enlarged sectional view drawing of the end head of the connecting tube of the conventional double-optical fiber signal connector.
Figure 2:
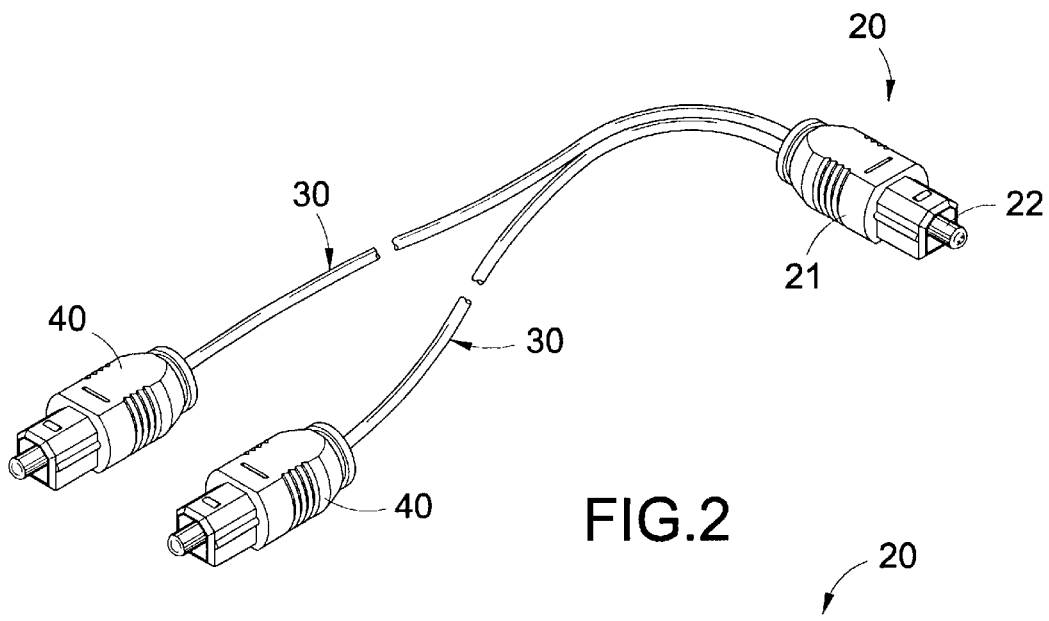
FIG. 2 is a pictorial view drawing of the optical fiber signal connector of the present invention.
Figure 3A:
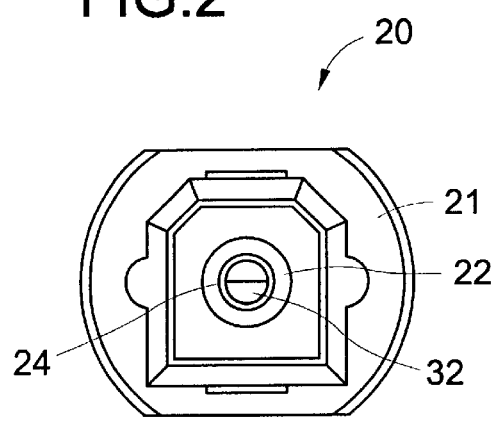
FIG. 3A is a right lateral view drawing of FIG. 3.
Figure 3:
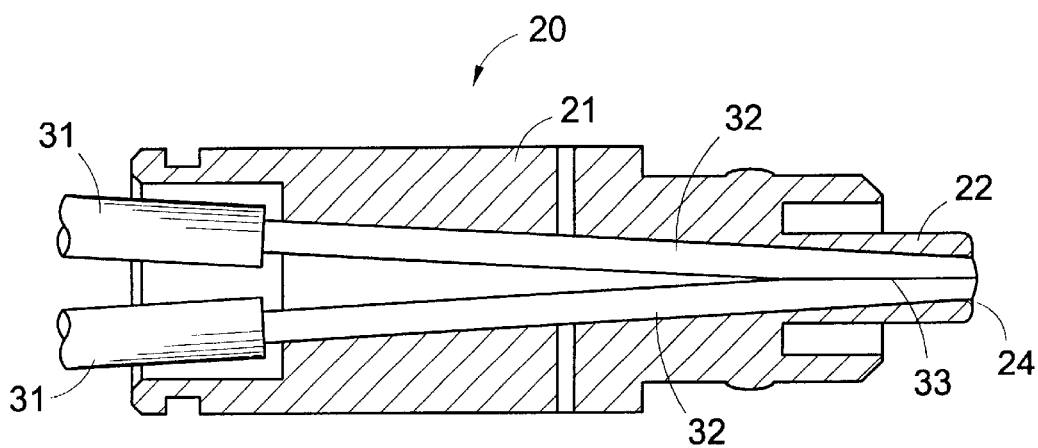
FIG. 3 is a sectional view drawing of the optical fiber signal connector of the present invention.
Figure 4:
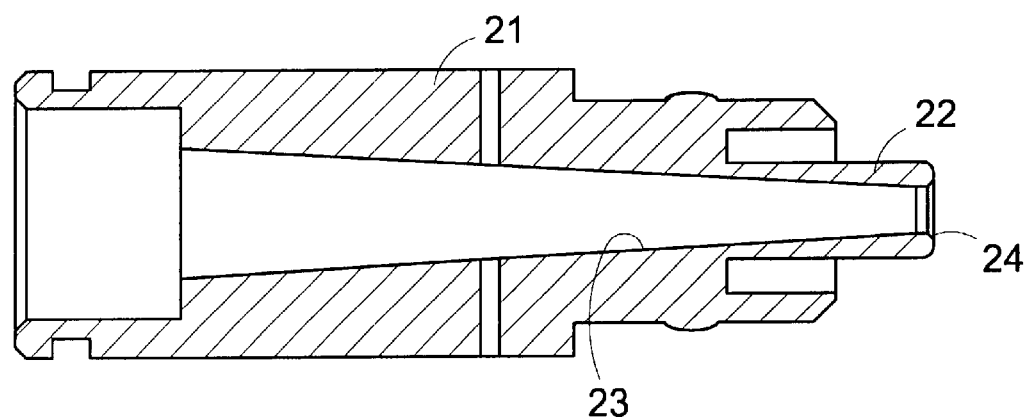
FIG. 4 is a cross sectional drawing of the connector body of the present invention.
Figure 5:
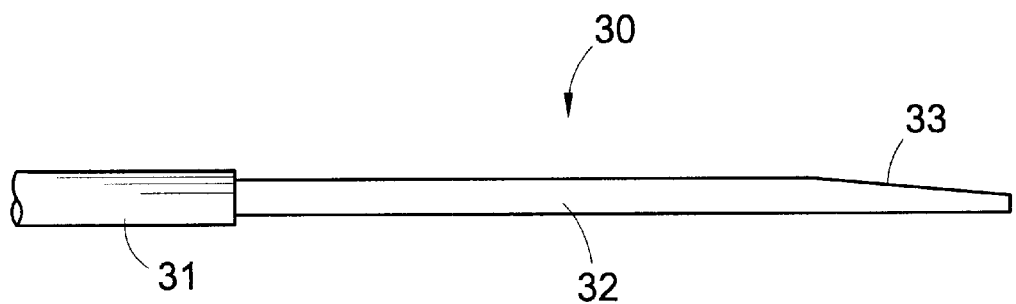
FIG. 5 is a plane drawing of the optical fiber conducting wire of the present invention.
Figure 5A:
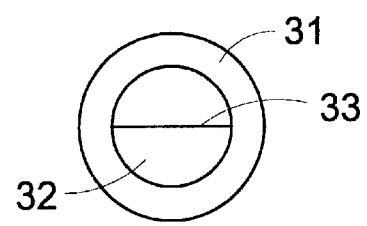
FIG. 5A is a right lateral view of FIG. 5.

Referring from FIG. 2 to FIG. 5 for the optical fiber signal connector (20) of the present invention, the said optical fiber signal connector (20) is, via two optical fiber conducting wires (30), connected to the single-optical fiber connectors (40) of two respective parting lines on the other end. As shown in FIG. 4, the said optical fiber signal connector (20) is manufactured to have one connector body (21) and one connecting tube (22); the interior surface of the said connecting tube (22) is formed as an inclined cave (23) for accommodating two optical fiber conducting wires (30); as shown in FIG. 5, the said optical fiber conducting wire (30) includes a covered layer (31) with a optical fiber core wire (32) mounted therein; one end of the optical fiber core wire (32) is formed as an inclined plane (33), as shown in FIGS. 5 and 5A; therefore, after the two optical fiber core wires (32) are inserted into the inclined cave (23) of the connecting tube (22), the two inclined planes (33) will be in a cohered state and appear in a complete circular shape; the complete circular section can fill in the end head (24) of the connecting tube (22) with no gap existed, as shown in FIG. 3A, to ensure the excellent signal transmission functionality and, therefore to accomplish the signal wire structure of an optical fiber signal connector for two single-optical fiber connectors with two parting lines.

As shown in FIG. 3, the end section of the optical fiber core wire (32) projects outside the end head (24) of the connecting tube (22) with a proper length; the projected optical fiber core wire (32) can be processed by mirror molding machine, for instance, to be ground into a planar shape or heat welded into a spherical shape.

Figures 6, 6A:
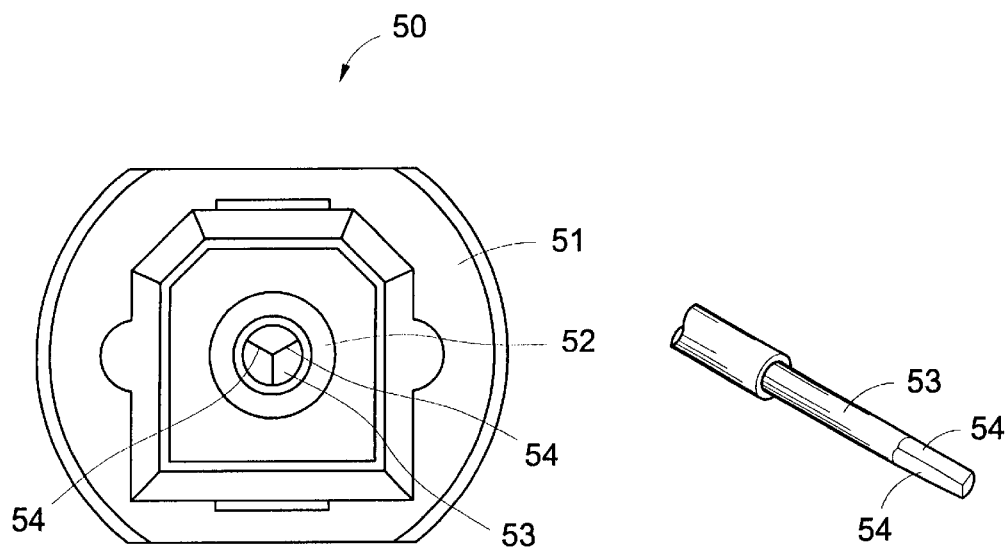
FIG. 6 is a right lateral view drawing of three optical fiber core wires inserted into the connector body.
FIG. 6A is a pictorial view drawing of the optical fiber conducting wire shown in FIG. 6.

As shown in FIG. 6, the embodiment of connecting a three-optical fiber signal connector (50) to three independent single-optical fiber signal connectors of three parting lines; three optical fiber core wires (53) are inserted into the connecting tube (52) of the connector body (51); as shown in FIG. 6A, one end of the optical fiber core wire (53) is formed as two adjacent inclined planes (54); therefore, after the three optical fiber core wires (53) are inserted into the connecting tube (52), the six inclined planes (54) will be in a cohered state and appear in a complete circular shape; the complete circular section can fill in the end head of the connecting tube (52) with no gap existed and ensure the excellent signal transmission functionality.

Figures 7, 7A:
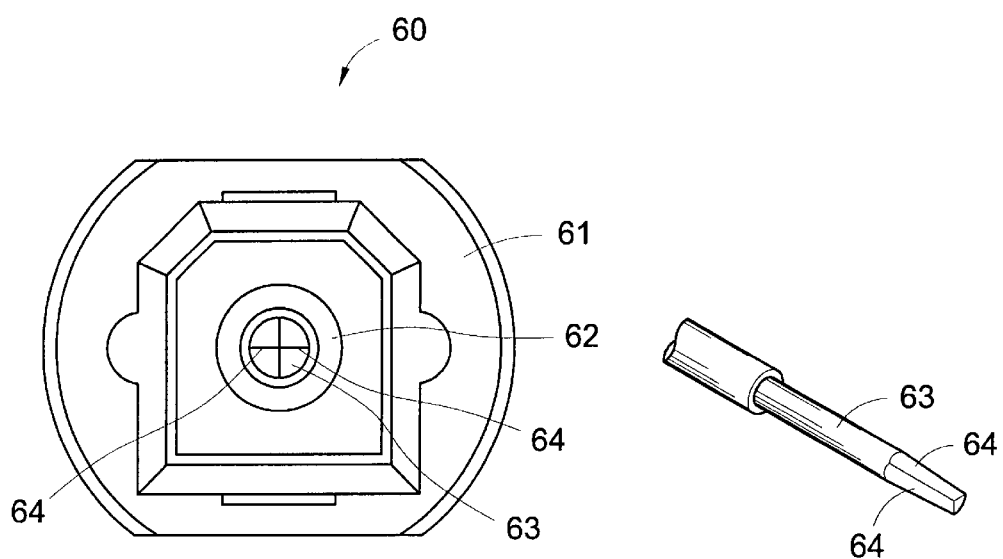
FIG. 7 a right lateral view drawing of four optical fiber core wires inserted into the connector body.
FIG. 7A is a pictorial view drawing of the optical fiber conducting wire shown in FIG. 7.

As shown in FIG. 7, the embodiment of connecting a four-optical fiber signal connector (60) to four independent single-optical fiber signal connectors of four parting lines; four optical fiber core wires (63) are inserted into the connecting tube (62) of the connector body (61); as shown in FIG. 7A, one end of the optical fiber core wire (63) is formed as two adjacent inclined planes (64); therefore, after the four optical fiber core wires (63) are inserted into the connecting tube (62), the eight inclined planes (64) will be in a cohered state and appear in a complete circular shape; the complete circular section can fill in the end head of the connecting tube (62) with no gap existed and ensure the excellent signal transmission functionality.

In summation of the foregoing sections, the present invention not only has overcome the shortcomings of causing gap to form at the welding location between the round section of the optical fiber core wire and the end head of the connecting tube, but also provides a connecting structure of two or more than two optical fiber core wires to be able to fill in the end head of the connecting tube for ensuring the excellent signal transmission functionality.

Although the specific embodiment of the present invention has been illustrated above, it is apparent to those skilled in the art that many variations or modifications to be achieved easily will not separate from the spirit of the present invention. The scope of the claims applied for new patent rights also try to include all the variations or modifications within the spiritual scope of the present invention.

What is claimed is:

1. An optical fiber signal connector assembly comprising:

a) a plurality of optical fiber conducting wires, each conducting wire including an optical fiber core and a covering layer, each conducting wire having a first end portion wherein the optical fiber core has a convexly curved outer surface and at least one inclined planar surface, and a second end;

b) single-optical fiber connectors attached to the second ends of the conducting wires; and, c) a connector body including a tapered hole and a connecting tube, the first end portions of the plurality of optical fibers extending into the tapered hole and the connecting tube such that the at least one inclined planar surface of each conducting wire contacts an inclined planar surface of an adjacent conducting wire, such that the first end portions have a circular cross-section completely filling the connecting tube.

2. The optical fiber signal connector assembly of claim 1 wherein each optical fiber conducting wire has a single inclined planar surface.

3. The optical fiber signal connector assembly of claim 1 wherein each optical fiber conducting wire has two inclined planar surfaces.

4. The optical fiber signal connector assembly of claim 1 wherein each optical fiber conducting wire has three inclined planar surfaces.

* * * * *